United States Patent [19]
Iizuka

[11] Patent Number: 5,587,825
[45] Date of Patent: Dec. 24, 1996

[54] SCANNING OPTICAL SYSTEM

[75] Inventor: Takashi Iizuka, Tokyo, Japan

[73] Assignee: Asahi Kogaku Kogyo Kabushiki Kaisha, Tokyo, Japan

[21] Appl. No.: 904,320

[22] Filed: Jun. 25, 1992

[30] Foreign Application Priority Data

Jun. 26, 1991 [JP] Japan .................................. 3-252687
Apr. 21, 1992 [JP] Japan .................................. 4-101383

[51] Int. Cl.⁶ .......................... G02B 26/08; H01J 3/14; H01J 5/16; H01J 40/14
[52] U.S. Cl. ........................ 359/204; 359/217; 250/236
[58] Field of Search .................................. 359/204, 205, 359/216, 217, 218, 219, 250; 250/234, 235, 236; 358/206, 148; 348/500, 202, 203

[56] References Cited

U.S. PATENT DOCUMENTS

| | | | |
|---|---|---|---|
| 4,024,341 | 5/1977 | Takahashi | 358/206 |
| 4,667,099 | 5/1987 | Arai et al. | 250/235 |
| 4,806,753 | 2/1989 | Noguchi | 250/235 |
| 4,831,247 | 5/1989 | Ishizaka | 250/236 |
| 4,962,312 | 10/1990 | Matuura et al. | 250/236 |
| 5,124,829 | 6/1992 | Ishikawa | 359/204 |
| 5,140,427 | 8/1992 | Nakane et al. | 358/206 |
| 5,173,798 | 12/1992 | Naiki | 359/216 |

*Primary Examiner*—Georgia Y. Epps
*Assistant Examiner*—Jacqueline Steady
*Attorney, Agent, or Firm*—Sughrue, Mion, Zinn, Macpeak & Seas

[57] ABSTRACT

The improved scanning optical system comprises a gas laser 10 for generating writing beam, a semiconductor laser 50 for generating monitoring beam of a different wavelength than the writing beam, a polygonal mirror 20 for deflecting and scanning the rays of light from each of the sources, a scanning lens 30 with which the rays of light deflected by the polygonal mirror 20 are focused on an image plane 40, a dichroic mirror 60 provided between the scanning lens 30 and the image plane 40 to isolate the monitoring beam from the optical path of the writing beam, and a signal generator A that receives the isolated monitoring light to generate a monitor signal. This optical system will not lower the energy of the writing beam, will not experience any change in the quantity of the monitoring beam due to leakage, and is free from the problem of curvature in the scanning lines of the monitoring beam.

16 Claims, 3 Drawing Sheets

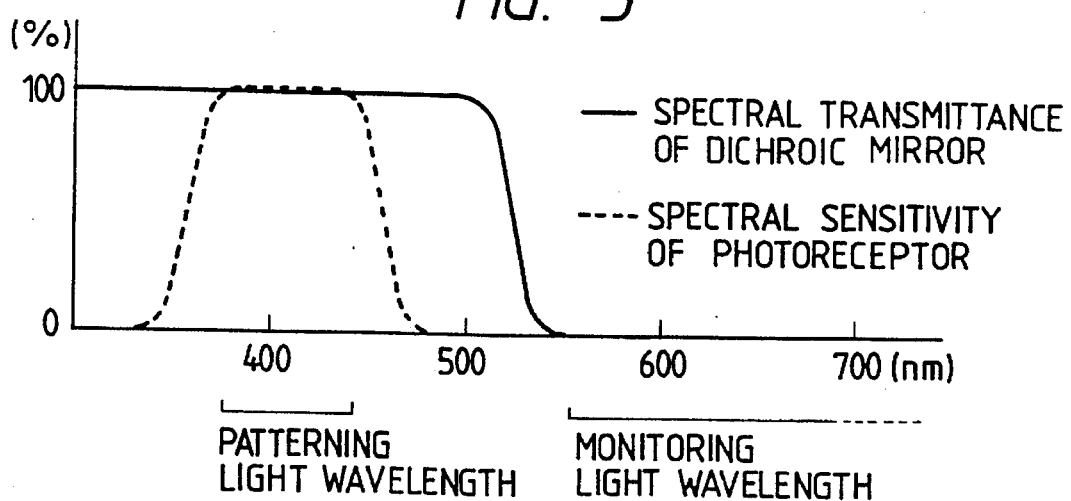
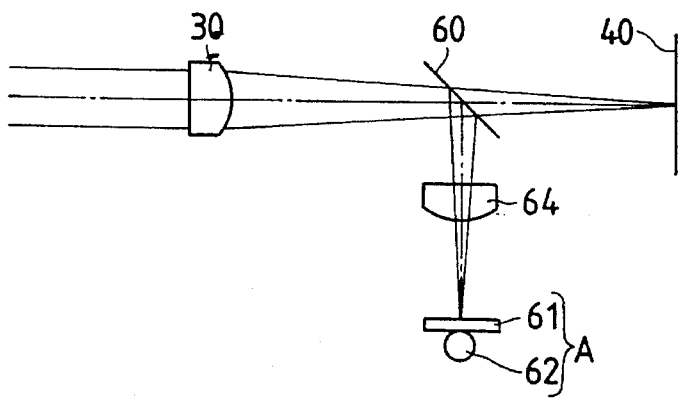
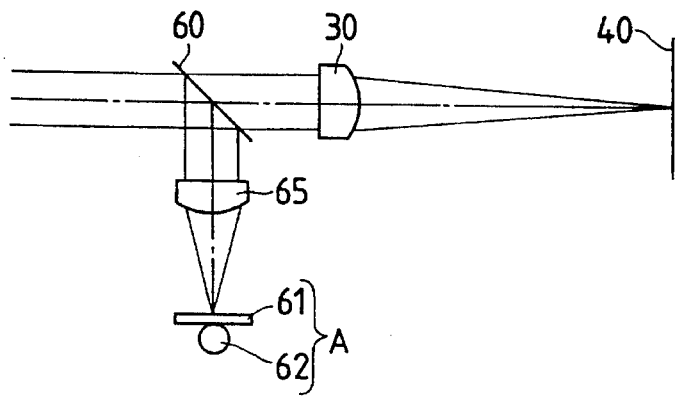

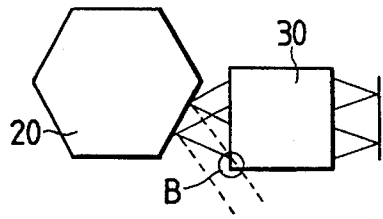
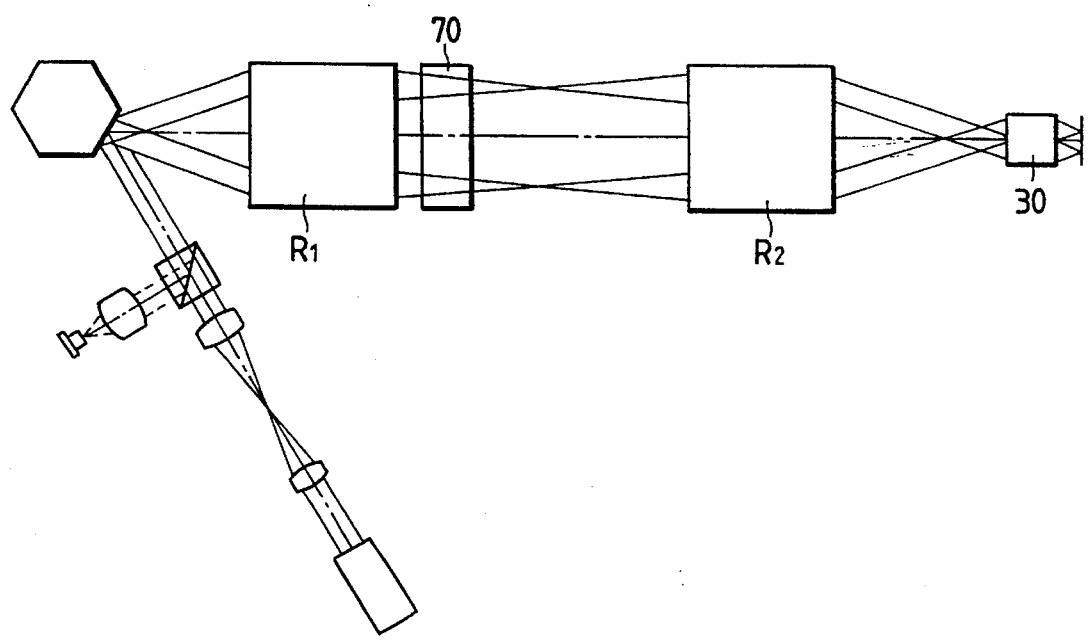
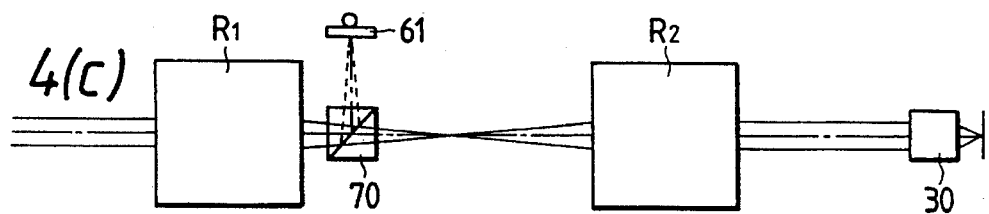
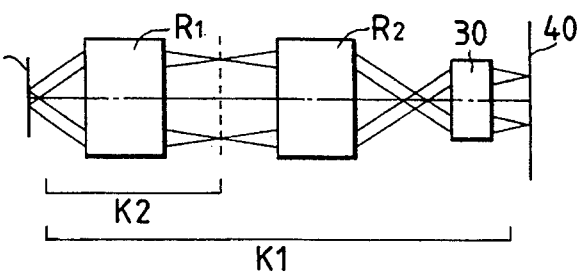

5,587,825

SCANNING OPTICAL SYSTEM

BACKGROUND OF THE INVENTION

This application is based on and claims priority from Japanese Patent Application Nos. HEI 3-252687 filed Jun. 26, 1991 and HEI 4-101383 filed Apr. 21, 1992, the disclosure of which is incorporated by reference herein.

The present invention relates to a scanning optical system such as a laser printer or a laser photoplotter and, more particularly, to a system having a monitoring unit that is capable of indirect detection of the position in which a laser beam spot is scanned over the image plane.

Some conventional models of scanning optical system that require high patterning or imaging precision are equipped with a monitoring optical unit for detecting the position in which a laser beam spot is scanned over the image plane. The conventional monitoring optical units are available in various types; in one type, part of the writing beam is isolated by a half mirror and used for monitoring purposes; in another type, the output light is divided into two beamlets by means of a polarizing beam splitter; and in still another type, the writing beam and the monitoring beam are allowed to fall on a polygonal mirror at different angles of incidence with respect to the sub-scanning direction, whereby the two light beams are spatially separated.

However, the respective types have their own problems. The optical unit using a half mirror is unable to produce a monitor signal, when patterning or imaging is not done. With the unit that uses a polarizing beam splitter, perfect isolation of polarized beams is impossible. In addition, since the polarizing performance is varied in accordance with the angle of incidence of the beam relative to the polarizing splitter, the quality to the written image would be adversely affected. The unit for achieving spatial isolation between the writing beam and the monitoring beam has the problem of curvature in the scanning lines of the monitoring beam. In addition, efficient isolation is difficult if a scanning lens of small F number is to be used.

SUMMARY OF THE INVENTION

The present invention has been accomplished under these circumstances and has as an object providing a scanning optical system that will not lower the energy of the writing beam, that is capable of patterning an image without being adversely affected by the "leakage" of the monitoring beam, and that is free from the problem of curvature in the scanning lines of the monitoring light. The "leakage" means that monitoring beam which is not to reach the image plane is not perfectly isolated from the writing beam and will reach the image plane.

This object of the present invention can be attained by a scanning optical system that comprises: a writing beam source for generating a writing beam; a monitoring beam source for generating a monitoring beam of a different wavelength than the writing light; a deflector for deflecting and scanning the rays of light from each of the sources; a scanning lens with which the beams deflected by the deflector are focused on an image plane; an isolating means provided between the scanning lens and the image plane to isolate the monitoring beam from the optical path of the writing beam; and a signal generating means that receives the isolated monitoring beam to generate a monitor signal.

BRIEF DESCRIPTION OF THE DRAWINGS

In the accompanying drawings:

FIG. 3 is a graph showing the spectral (or exposure) sensitivity of the photoreceptor and the spectral transmittance of the dichroic mirror as they relate to the wavelength ranges of the writing and monitoring beam;

FIG. 4 (a) is a plan view of a scanning optical system of the present invention employing a f·θ lens with a short focal length.

FIG. 4 (b) is a sectional view showing a main scanning direction of a second embodiment of the present invention;

FIG. 4 (c) is a sectional view showing a sub scanning direction of the second embodiment of the present invention;

FIG. 4 (d) is a diagram illustrating the scanning characteristics of the monitoring and writing beams; and FIGS. 5 and 6 are views showing modifications of the invention.

DESCRIPTION OF THE PREFERRED EMBODIMENTS

Figure 1:
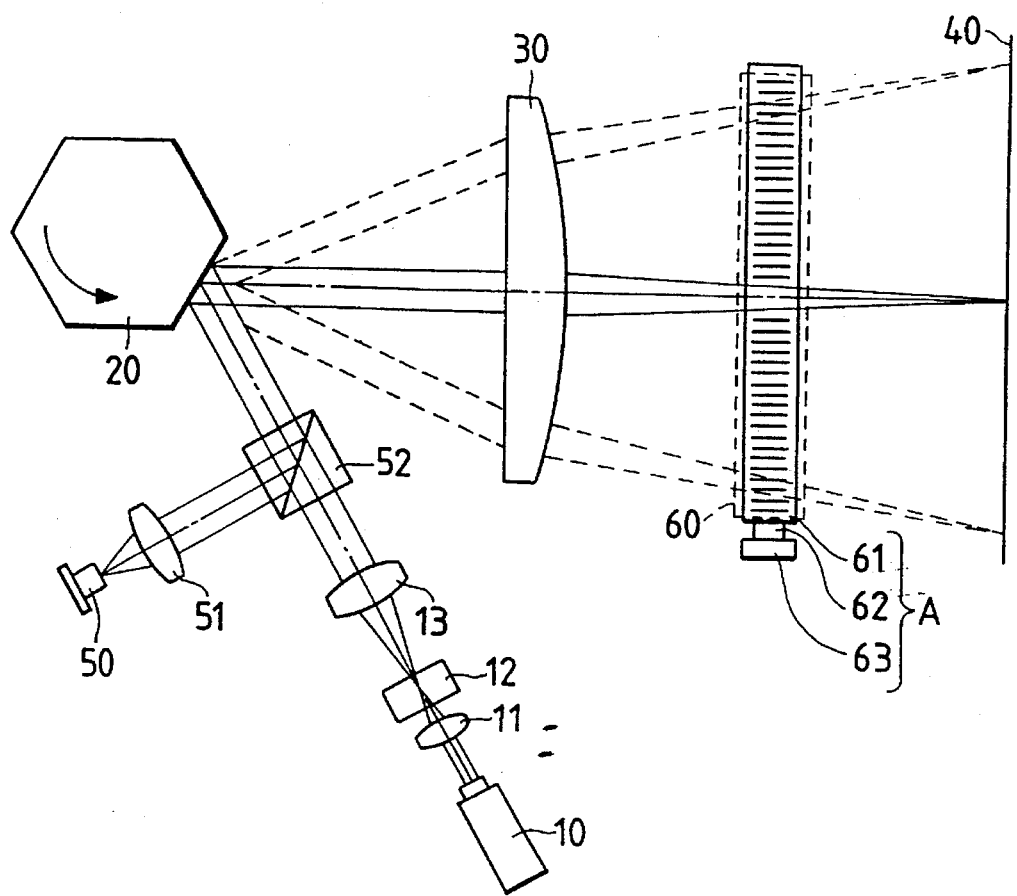
FIG. 1 is a plan view of a scanning optical system according to an embodiment of the present invention.

The scanning optical system of the present invention is described hereinafter with reference to FIGS. 1 to 4, which show a first embodiment of the invention. A gas laser 10, which is a writing beam source, emits rays of writing light, which are converged by a converging lens 11, modulated by an A/O modulator 12 and made parallel by a collimator lens 13. The collimated writing beam is reflected and deflected by a polygonal mirror 20 and focused to form an image on an image plane 40 by means of a scanning f·θ lens 30.

A semiconductor laser 50 emits a monitoring beam of a different wavelength than the writing beam, and is made parallel by a collimator lens 51 before admission into a dichroic prism 52. The prism 52 has such characteristics that it is transmits the wavelength of the writing beam while it reflects the wavelength of the monitoring beam, and the two beams are superposed before falling on the polygonal mirror 20.

The monitoring beam which has been reflected and deflected by the polygonal mirror 20 together with the writing beam is condensed by the f·θ lens 30 before it is launched into a dichroic mirror 60 which is an isolating means provided between the f·θ lens 30 and the image plane 40. The dichroic mirror 60 which has the same characteristics as the dichroic prism 52 transmits the writing beam while reflecting the monitoring beam.

The system also has a signal generating means A that detects the incident monitoring beam. As shown in FIG. 1, it consists of a glass scale 61 having short slits formed on equal pitches at the end face into which the incident light is launched, a fiber bundle 62 having a plurality of fluorescent fibers bundled together, and a PIN photodiode 63 provided at the end of the fiber bundle 62.

Figure 2:
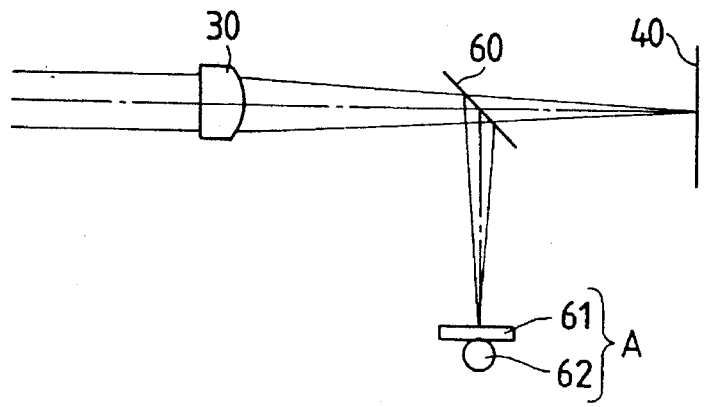
FIG. 2 is a side view showing the essential part of the system shown in FIG. 1.

The monitoring beam is reflected by the dichroic mirror 60 as shown in FIG. 2, so that it passes through the scale 61 to be launched into the fluorescent fiber bundle 62 from the lateral side. Upon exposure to the monitoring beam, fluorescence is produced within the fibers and propagates through them to teach the PIN photodiode.

When the monitoring beam is scanned over the scale 61, the PIN photodiode 63 will produce a sinusoidal output. The sinusoidal wave is shaped into a rectangular wave, which is supplied into the control unit and used for timed control of the A/O modulator 12. If the pitch of the slits is much greater than the spot diameter of either beam, pulses are used for control purposes with one pulse being divided electrically into a plurality of pulses.

FIG. 3 shows the spectral (or exposure) sensitivity of the photoreceptor and the spectral transmittance of the dichroic mirror as they relate to the wavelength ranges of the writing and monitoring beams. If the spectral sensitivity of the photoreceptor providing the image plane draws the curve indicated by the dashed line, the writing beam must be set to have a wavelength range corresponding to that curve. On the other hand, the monitoring beam is desirably set to have a wavelength within the range over which it is not transmitted through the dichroic mirror 60 in view of its spectral transmittance indicated by the solid line. In addition, the wavelength of the monitoring beam is desirably set to lie outside the spectral sensitivity range of the photoreceptor so that it will not affect the quality of patterned image even if it is transmitted through dichroic mirror 60.

The objects of the present invention are achieved if the wavelength of the monitoring beam is at least outside the spectral sensitivity range of the photoreceptor and, hence, the isolating means may be provided not only by a dichroic mirror but also by a half mirror. However, if a half mirror is used, the energy of the writing beam is lowered, so the writing speed must be slowed down. According to the embodiment just described above, the monitoring beam can be isolated from the writing beam without lowering its energy.

If the characteristics of the f·θ lens for the writing beam differ from those for the monitoring beam on account of the effect of chromatic aberration, the focusing position of the monitoring beam can potentially fail to match exactly with that of the writing beam. To avoid this possibility, the f·θ lens in the embodiment under consideration is corrected for aberrations at the wavelengths of both the writing and monitoring beams and this assures that the focusing position of the writing beam is correctly detected on the basis of the monitoring beam.

The scanning optical system of the present invention is described hereinafter with reference to FIGS. 4 (a) to (d), which show a second embodiment of the invention. As shown in FIG. 4 (a), when a space between the polygonal mirror 20 and the f·θ lens 30 is not adequately obtained and a focal length of the f·θ lens 30 is short, the f·θ lens 30 and the two beams passing through an end portion of the f·θ lens 30 cause an interference at a portion B. Further, in this case, if the polygonal mirror 20 is large, the f·θ lens 30 would collide with the polygonal mirror 20. Furthermore, when the spaces between the polygonal mirror 20 and the f·θ lens 30 and between the f·θ lens 30 and the image plane 40 are small, the scanning optical system does not employ the isolating means provided in the space, for example, between the f·θ lens 30 and the image plane 40.

In these cases, a relay lens, which is longer in a focal length from the f·θ lens 30, is employed to achieve a deflecting point moving from the polygonal mirror 20 to an area distanced from the polygonal mirror 20. In the second embodiment of the present invention as shown in FIGS. 4 (b) and (c), a pair of telecentric lenses are used to solve the problem described above. The isolating means 70 is disposed between the relay lenses $R_1$ and $R_2$ in this embodiment.

In this condition, an image formed between a pair of the relay lenses $R_1$ and $R_2$ is enlarged in response to a ratio focal lengths of the relay lenses $R_1$ and $R_2$. If a resolution existing on the image plate 40 is required in a fine characteristic, the pitch of the scale 61 becomes narrow. However, it is difficult to produce the scale 61 with a narrow pitch. At this time, the image which is formed between a pair of relay lenses is picked up and utilized so that the pitch of the scale is also enlarged with respect to the ratio the focal lengths, namely the ratio of $K_1$ and $K_2$. As a result, the pitch of the scale is easily manufactured.

However, when the distortion of a image formed between a pair of relay lenses $R_1$ and $R_2$ and the distortion of the f·θ lens 30 are different from each other, the correction is required to meet the following condition.

For obtaining a generalized solution, let us assume the optical system shown in FIG. 4 (d). The rays of light issued from the polygonal mirror 20 pass through a first and a second relay lens R1 and R2 and are then focused on the image plane 40 by means of the f·θ lens 30. The scale 61 in the signal detecting means A is positioned on a plane optically equivalent to the point intermediate between the first and second relay lenses.

If the coefficient of scanning by the imaging optical unit and that by the first relay lens R1 (i.e., the monitoring optical unit) are written as K1 and K2, respectively, the image height for the writing beam, y1, and that for the monitoring beam, y2, can be expressed by the following equations (1) and (2):

$$y1 = K1 \cdot \theta + DST1 \tag{1}$$

$$y2 = K2 \cdot \theta + DST2 \tag{2}$$

where

θ: the angle of deflection from the optical axis as caused by the polygonal mirror;

DST1: the distortion of scanning by the imaging optical unit;

DST2: the distortion of scanning by the monitoring optical unit.

From Eqs. (1) and (2), one derives:

$$y2 = (K2/K1)(y1 - DST1) + DST2 \tag{3}$$

The value of y2 for the case where y1 is varied on equal pitches is calculated by Eq. (3) and the pitch of slits in the scale 61 is set on the basis of the calculated value of y2. As a result, the pitch of pulses in the output monitor signal can be brought into exact agreement with the pitch for the movement of the writing beam.

If the patterning optical unit and the monitoring optical unit use the same f·θ lens as in the system shown in FIG. 1, K1 is equal to K2 and, hence, Eq. (3) can be rewritten as:

$$y2 = y1 - DST1 + DST2.$$

FIG. 5 is a cross-sectional view, similar to FIG. 2, showing a modification according to the invention. In the case where the performance of f·θ lens 30 is set so as to be effective only relative to wavelengths of the writing beam, the monitoring beam often has aberrations such as curvature of field and scanning distortion. Accordingly, in this example, an auxiliary lens 64 is interposed between a dichroic mirror 60 and a scale 61 to correct the aberrations of the monitoring beam.

Incidentally, if the curvature of field falls within an allowable range without the auxiliary lens, it is sufficient to compensate for only the scanning distortion. Also, it is possible to correct only the curvature of field with the auxiliary lens 64, while correcting the scanning distortion by adjusting the pitch of the scale 61 as mentioned before.

FIG. 6 is a cross-sectional view, similar to FIG. 2, showing another modification of the invention. In this example, respective discrete scanning lenses are provided for the monitoring beam and the writing beam.

Both monitoring and writing beams reflected by the polygonal mirror are separated by the dichroic mirror 60. The writing beam that has passed through the mirror 60 is focused on the image plane 40 by the f·θ lens 30, and the reflected monitoring beam is focused on the scale 61 by the f·θ lens 65 for the monitoring beam.

With the arrangement shown in FIG. 6, since the f·θ lens may be set so as to exhibit the satisfactory performances for the respective wavelengths, it is possible to detect the position of the writing beam by detecting the position of the monitoring beam.

As described on the foregoing pages, the writing beam and the monitoring beam used in the scanning optical system of the present invention are made different from each other in terms of wavelength and, hence, the two light beams can be easily separated by using an isolating means such as dichroic mirror. If the wavelength of the monitoring light is selected from the range where the photoreceptor is insensitive, the image being patterned will not be affected in any way even if the monitoring beam reaches the patterning plane on account of the incomplete performance of the dichroic mirror.

What is claimed is:

1. A scanning optical system comprising:

a writing beam source for generating a writing beam;

a monitoring beam source for generating a monitoring beam of a different wavelength than said writing beam;

combining means for combining said writing beam and said monitoring beam;

a deflector for deflecting and scanning the rays of light from each of said sources;

a scanning lens with which the rays of light deflected by said deflector are focused on an image plane;

an isolating means provided between said deflector and said image plane to isolate the monitoring beam from the optical path of the writing beam;

a signal generating means that receives the isolated monitoring beam to generate a monitor signal; and a photoreceptor disposed at said image plane, wherein said monitoring beam has a wavelength which said photoreceptor is incapable of sensing.

2. The scanning optical system according to claim 1, wherein said isolating means comprises a dichroic mirror.

3. A scanning optical system according to claim 1, further comprising at least one relay lens provided between said deflector and said scanning lens to insure that the rays of light deflected by said deflector are guided to a predetermined entrance pupil of the scanning lens.

4. The scanning optical system according to claim 1, wherein said scanning lens is corrected for aberrations at the wavelengths of both the writing beam and the monitoring beam.

5. A scanning optical system comprising:

a writing beam source for generating a writing beam;

a monitoring beam source for generating a monitoring beam of a different wavelength than said writing beam;

combining means for combining said writing beam and said monitoring beam;

a deflector for deflecting and scanning the rays of light from each of said sources;

an isolating means provided between said deflector and said image plane to isolate the monitoring beam from the optical path of the writing beam;

a signal generating means that receives the isolated monitoring beam to generate a monitor signal;

a photoreceptor disposed at said image plane;

an imaging optical unit for imaging said writing beam onto said image plane;

a monitoring optical unit for providing said monitoring beam to said isolating means; and a scale that generates signals at positions of y2, or the image height for monitoring beam, that correspond to equally spaced positions of y1, or the image height for writing beam, in such a way as to satisfy the relation:

$$y2=(k2/k1)(y1-DST1)+DST2$$

wherein k1: a coefficient of scanning with said imaging optical unit;

k2: a coefficient of scanning with said monitoring optical unit;

DST1: a distortion (deviation from an f·θ characteristic) of scanning with the imaging optical unit;

DST2: a distortion (deviation from an f·θ characteristic) of scanning with the monitoring optical unit; and wherein said monitoring beam has a wavelength to which said photoreceptor is insensitive.

6. The scanning optical system according to claim 5, which satisfies the relation DST2=αDST1, where α is a given constant.

7. A scanning optical system according to claim 5, wherein said imaging optical unit and said monitoring optical unit each include a scanning lens.

8. A scanning optical system comprising:

a writing beam source for generating a writing beam;

a monitoring beam source for generating a monitoring beam of a different wavelength than said writing beam;

combining means for combining said writing beam and said monitoring beam;

a deflector for deflecting and scanning the rays of light from each of said sources;

a scanning lens with which the rays of light deflected by said deflector are focused on an image plane;

an isolating means provided between said deflector and said image plane to isolate the monitoring beam from the optical path of the writing beam;

a signal generating means that receives the isolated monitoring beam to generate a monitor signal;

an imaging optical unit for imaging said writing beam onto said image plane, a monitoring optical unit for providing said monitoring beam to said isolating means, and a scale that generates signals at positions of y2, or the image height for monitoring beam, that correspond to equally spaced positions of y1, or the image height for writing beam, in such a way as to satisfy the relation:

$$y2=(k2/k1)(y1-DST1)+DST2$$

wherein k1: a coefficient of scanning with said imaging optical unit;

k2: a coefficient of scanning with said monitoring optical unit;

DST1: a distortion (deviation from an f·θ characteristic) of scanning with the imaging optical unit;

DST2: a distortion (deviation from an f·θ characteristic) of scanning with the monitoring optical unit.

9. The scanning optical system according to claim 8, which satisfies the relation DST2=αDST1, where α is given constant.

10. A scanning optical system according to claim 8, wherein said imaging optical unit and said monitoring optical unit each include said scanning lens.

11. A scanning optical system according to claim 8, further comprising at least one relay lens provided between said deflector and said scanning lens to insure that the rays of light deflected by said deflector are guided to a predetermined entrance pupil of the scanning lens.

12. The scanning optical system according to claim 11, wherein said imaging optical unit includes said scanning lens and said at least one relay lens, and said monitoring optical unit includes said at least one relay lens.

13. A scanning optical system comprising:

a writing beam source for generating writing beam;

a monitoring beam source for generating monitoring beam of a different wavelength than said writing beam;

combining means for combining said writing beam and said monitoring beam;

a deflector for deflecting and scanning the rays of light from each of said sources;

a scanning lens with which the writing beam deflected by said deflector are focused on an image plane;

an isolating means provided between said deflector and said scanning lens to isolate the monitoring beam from the optical path of the writing beam;

a signal generating means that receives the isolated monitoring beam to generate a monitor signal and has a scale; and a monitoring scanning lens provided between said isolating means and said scale to focus the monitoring beam on said scale.

14. A scanning optical system according to claim 13, wherein the scanning lens and the monitoring lens are f·θ lenses.

15. A scanning optical system comprising:

a writing beam source for generating a writing beam;

a monitoring beam source for generating a monitoring beam of a different wavelength than said writing beam;

combining means for combining said writing beam and said monitoring beam;

a deflector for deflecting and scanning the rays of light from each of said sources;

a scanning lens with which the rays of light deflected by said deflector are focused on an image plane;

an isolating means provided between said scanning lens and said image plane to isolate the monitoring beam from the optical path of the writing beam;

a signal generating means that receives the isolated monitoring beam to generate a monitor signal;

said signal generating means having a scale; and an auxiliary lens, disposed between the isolating means and the scale, for compensating aberration in the monitoring beam.

16. A scanning optical system according to claim 15, wherein the scanning lens is an f·θ lens.

\* \* \* \* \*